United States Patent
Hughes

[19]

[11] Patent Number: 5,829,243

[45] Date of Patent: Nov. 3, 1998

[54] REPLACEABLE TIP CABLE HANDLER

[76] Inventor: Ceiriog Hughes, 8447 Edwood Rd., Pittsburgh, Pa. 15237

[21] Appl. No.: 883,273

[22] Filed: Jun. 26, 1997

Related U.S. Application Data

[63] Continuation-in-part of Ser. No. 574,726, Dec. 19, 1995, Pat. No. 5,642,612.

[51] Int. Cl.⁶ .................................................. F16G 13/16
[52] U.S. Cl. ................................ 59/78.1; 248/49; 248/75
[58] Field of Search ....................... 59/78.1, 900; 248/49, 248/68.1, 74.1, 75

[56] References Cited

U.S. PATENT DOCUMENTS

| | | | |
|---|---|---|---|
| 3,192,704 | 7/1965 | Macrae | 59/78.1 |
| 3,367,718 | 2/1968 | Hauschopp | 299/43 |
| 3,861,751 | 1/1975 | Erwien | 299/43 |
| 3,997,039 | 12/1976 | Hubbard et al. | 191/12 |
| 4,006,875 | 2/1977 | Smith et al. | 248/75 |
| 4,103,974 | 8/1978 | Nowacki et al. | 299/43 |
| 4,119,348 | 10/1978 | Cirtos | 299/43 |
| 4,391,471 | 7/1983 | Hauschopp et al. | 299/43 |
| 4,458,950 | 7/1984 | Schwarting et al. | 299/43 |
| 4,483,567 | 11/1984 | Schwarting | 299/43 |
| 4,514,011 | 4/1985 | Lodwig et al. | 299/42 |
| 4,545,621 | 10/1985 | Sharp | 299/12 |
| 4,564,241 | 1/1986 | Holz et al. | 299/43 |
| 4,852,342 | 8/1989 | Hart | 59/78.1 |
| 5,027,595 | 7/1991 | Hart | 59/78.1 |
| 5,240,209 | 8/1993 | Kutsch | 59/78.1 |
| 5,243,814 | 9/1993 | Hart | 59/78.1 |
| 5,497,536 | 3/1996 | Hart | 24/459 |

FOREIGN PATENT DOCUMENTS

| | | | |
|---|---|---|---|
| 2257492 | 1/1993 | United Kingdom | 59/78.1 |

OTHER PUBLICATIONS

"Mansign Nylon Cable Chains" an American Longwall brochure (Undated).
"Scorpion Nylon Cable Chain" a W.H. Dunn & Son Ltd. brochure (Undated).

*Primary Examiner*—David Jones
*Attorney, Agent, or Firm*—Webb Ziesenheim Bruening Logsdon Orkin & Hanson, P.C.

[57] ABSTRACT

A replaceable tip cable handler having links in a chain with removable and replaceable interlocking tips, wherein flexible members, such as cable and hose, are received between respective sets of interlocking tips. The interlocking tips engage each other at their respective ends via U-shaped extensions to retain the flexible members therebetween. The replaceable tip cable handler allows operators of the mining machines to repair or upgrade the cable handler in minutes by changing the interlocking tips without the expense of replacing links or the complete chain of links.

20 Claims, 4 Drawing Sheets

REPLACEABLE TIP CABLE HANDLER

This application is a continuation-in-part of U.S. Ser. No. 08/574,726 filed Dec. 19, 1995, now U.S. Pat. No. 5,642,612.

BACKGROUND OF THE INVENTION

1. Field of the Invention

The present invention relates to an apparatus that trails along with moving machinery and accommodates hose, cable or similar flexible supply lines required by the machinery to operate, and more particularly, to a cable handling system used in longwall mining operations.

2. Background Art

Longwall mining machines used in the mining industry require flexible cables and hoses, hereinafter referred to collectively as "flexible members". Longwall mining machines include a movable shearing machine. The flexible members trail behind the shearing machine and supply electric power, water and hydraulic fluid required for operation of the shearing machine. The longwall mining machines include cable handling systems that protect the flexible members from the harsh conditions attributed to mining and allow them to move along with the moving mining machine.

Usually, moving mining machines are integrated with systems that have conveyors to move the mined material. These systems include cable guides or cable handlers as the cable handling system. The cable guide allows the flexible members to be guided along the conveyor as the flexible members trail the moving mining machine during mining operations. The cable handler retains and protects the flexible members as the cable handler moves along with the moving mining machine during mining operations. The following patents are examples of cable guides and cable handlers developed for longwall mining: U.S. Pat. Nos. 3,367,718; 3,861,751; 3,997,039; 4,103,974; 4,119,348; 4,185,874; 4,391,471; 4,458,950; 4,483,567; 4,514,011; 4,545,621; and 4,564,241.

A Mansign center pull nylon cable handler made by American Longwall Mining Corporation of Abingdon, Va. is an industry standard. The Mansign cable handler includes a flexible chain made of nylon links. Links are interconnected to each other by bolts. Each link has a male end for connecting with a female end of an adjoining link. Each link includes spaced apart parallel extending tips and integrally formed as part of the link. Tips extend outwardly from a center of the link and flexible members are positioned between the tips and are positioned on opposite sides of center. The tips protect the flexible members from damage. A tempered spring steel clip is secured to each link to retain one of the flexible members to the link. The side of the link on which the steel clip is positioned alternates with respect to adjacent links in the chain.

Although the Mansign cable handler overcomes many of the known problems of earlier cable handler designs, it still has disadvantages. First, the tips tend to break off easily from the center during mining operations. Therefore, the cable handler cannot protect the exposed flexible member where a tip breaks off. Once one of the tips breaks off from a link, that broken link must be replaced by a new link. In order to replace the broken link, the respective steel clip must be removed. The male end and female end of the broken link must be unbolted from each adjoining link; a new link must be inserted in its place; and the steel clip must be replaced. This results in expensive and time-consuming procedures. A second disadvantage of the Mansign cable handler is that all of the links must be replaced when changing the outer dimensional size of one of the flexible members or when adding more flexible members that the current links cannot accommodate.

Therefore, it is an object of the present invention to provide a cable handling system having links that can be easily repaired when a tip breaks, thereby reducing the downtime and expense of repairing a cable handling system.

It is another object of the present invention to provide a cable handling system that can be reconfigured for the number of flexible members or the cross sectional size of the flexible members that each link can retain without replacing all of the links, thereby reducing the downtime and expense of a cable handling system during its reconfiguration.

SUMMARY OF THE INVENTION

The present invention includes a cable handler for receiving and handling a flexible member and having a flexible chain including a plurality of first links adapted to retain and protect the flexible member. Each of the first links includes a main body adapted to interconnect with adjacent first links and a pair of retaining tips secured to one side of the main body. One of the retaining tips is removably secured to the main body and the retaining tips are adapted to interconnect with each other and to receive and retain the flexible member therebetween.

Each of the retaining tips includes a retaining body that is adapted to coact with and frictionally engage the flexible member. An interlocking portion adjacent to the retaining body interlocks the retaining tips to retain the flexible member. The retaining tip that is removably secured to the main body includes a mating end for matingly engaging with the main body.

The first links may each further include a pair of guide tips secured to another side of the main body, wherein one of the guide tips is removably secured to the main body. The guide tips are spaced apart from each other and are adapted to receive the flexible member therebetween.

The cable handler may include a plurality of second links adapted to retain and protect the flexible member. Each of the second links includes another of the main body adapted to interconnect with adjacent first links or adjacent second links or both and a pair of guide tips extending from a side of other main body. One of the guide tips is removably secured to the other main body and the guide tips are spaced apart from each other and are adapted to receive the flexible member therebetween.

The guide tips each include a guide body that is adapted to coact with and frictionally engage the flexible member and an end portion adjacent to the guide body for guiding the flexible member. The guide tip that is removably secured to the other main body includes a mating end for matingly engaging with the other main body. Preferably, each of the retaining tips and the guide tips are removably secured to their respective main bodies and each include a mating end for matingly engaging with each of their respective main bodies.

The main body of the links includes an upper section and a lower section opposing each other and a side located therebetween. A flange end is adjacent to each of the upper and lower sections on the side. Each retaining tip is removably secured to one of the flange ends and extends outwardly from the sides. The main body has an I-beam shape having a web forming the side and the retaining tips define a recess in the mating end to receive the flange ends. The main body also includes a male end and a female end opposite the male end wherein the male end is adapted to interconnect with the female end of an adjacent one of the links.

The body is preferably made from steel and the retaining tips and the guide tips are preferably made from plastic. The links preferably are colored a reflective color to promote visibility by an operator. Plastic contour sections are bonded to the side of the web and include at least one rib adapted to retain the flexible member.

The present invention also includes a link for a cable handler for receiving and handling a flexible member. The link includes a body adapted to interconnect the link to another link to form a chain of links and a pair of retaining tips secured to the body. One of the retaining tips is removably secured to the body and the retaining tips are adapted to interconnect with each other and to receive and retain the flexible member therebetween.

The link may further include a pair of guide tips secured to the body, wherein one of the guide tips is removably secured to the body. The guide tips are spaced apart from each other and are adapted to receive another flexible member therebetween.

The body includes a first end, a second end opposite the first end, a center section and an upper section and a lower section opposing each other with the center section located between the upper and lower sections. A male end extends from the first end and a female end extends from the second end, wherein the male end is adapted to interconnect with the female end of another of the link. The retaining tips are each removably secured to a flange end adjacent to the upper and lower sections on a side of the center section and the retaining tips extend outwardly from the side.

The present invention also includes a replacement tip for a cable handler having a main body that receives and handles a flexible member. The replacement tip includes a retaining body, a mating end for mating with the main body and an interlocking end adapted to interlock with another tip for retaining the flexible member between the tips. The interlocking end preferably has a J-shape.

The present invention further includes a method for repairing a cable handler made up of a plurality of links where each of the links includes a body and removable tips that receive and handle a flexible member having the steps of: (i) removing a broken tip from the body, (ii) securing a replacement tip to the body, and (iii) interlocking the replacement tip with another tip secured to the body.

DESCRIPTION OF THE PREFERRED EMBODIMENT

Figure 1:
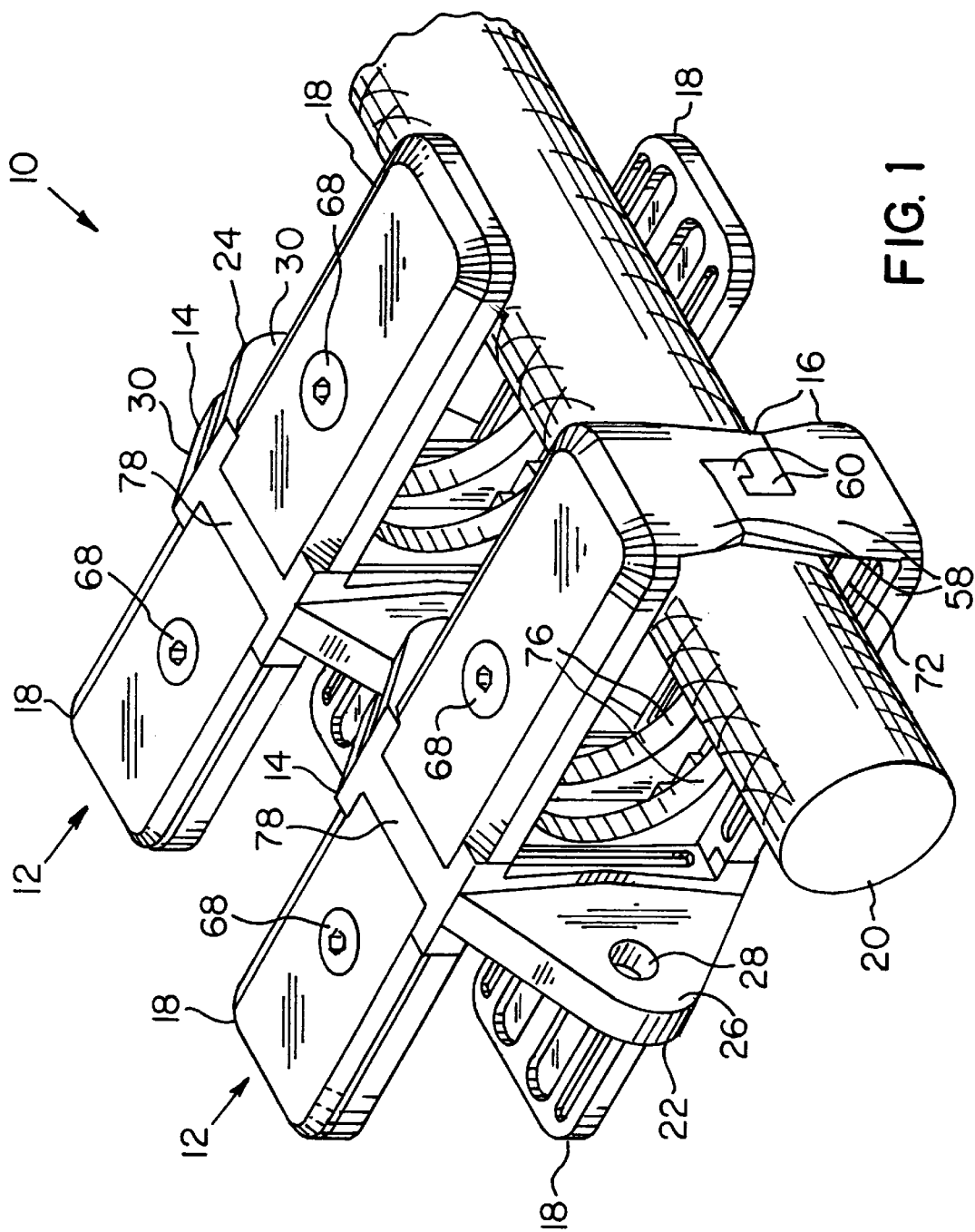
FIG. 1 is a perspective view of a replaceable tip cable handler made in accordance with the present invention.
Figure 2:
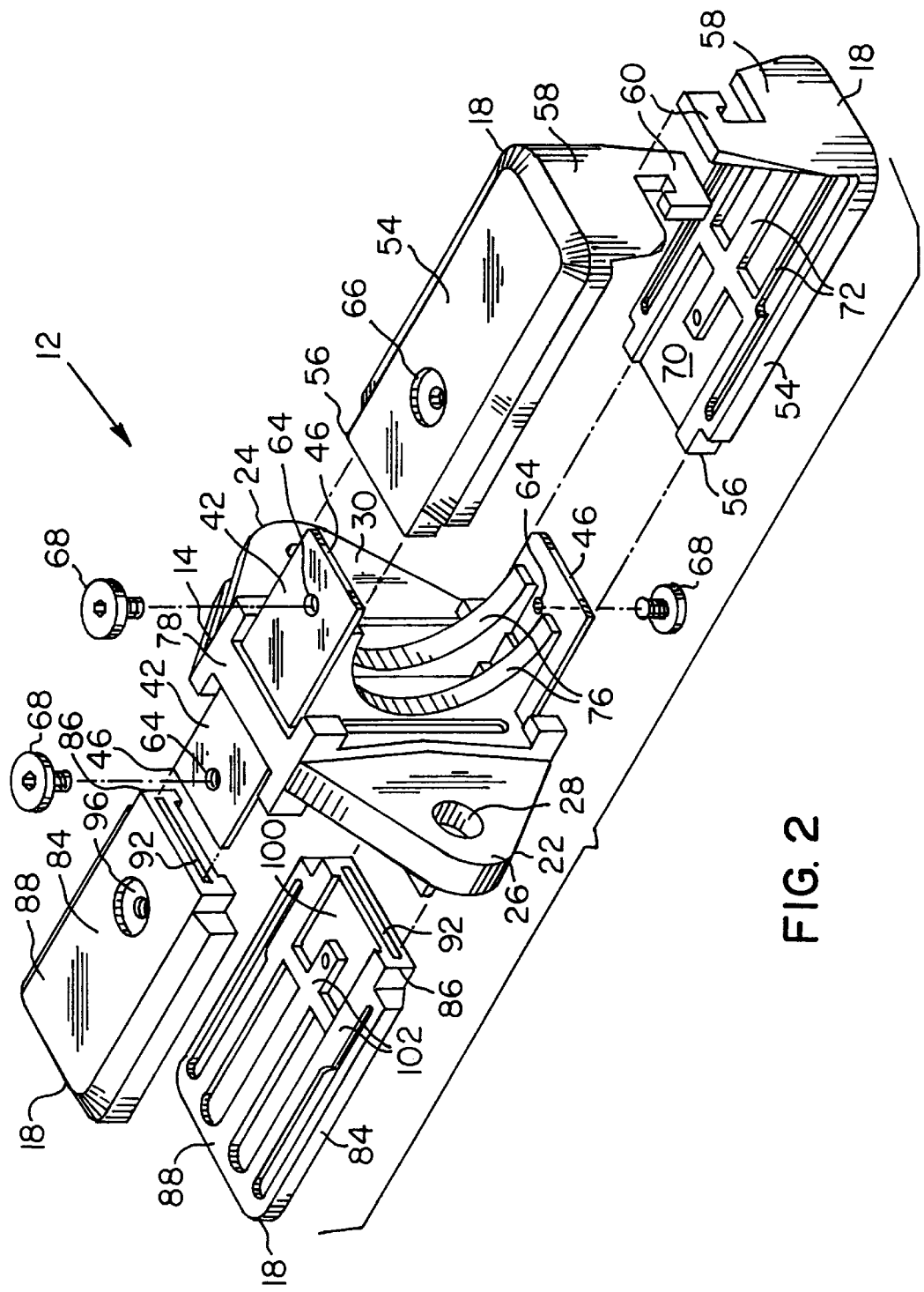
FIG. 2 is a perspective exploded view of a link of the cable handler as shown in FIG. 1.

FIGS. 1 and 2 show a replaceable tip cable handler 10 made in accordance with the present invention. The replaceable tip cable handler 10 includes a plurality of adjacent individual links 12 which are joined to form a flexible chain as shown in FIG. 1.

The link 12 may include a main body 14 with a pair of retaining tips 16 removably secured to one side of the body 14. Another pair of retaining tips 16 may be removably secured to the other side of the body 14 or, as shown in FIGS. 1 and 2, a pair of guide tips 18 may be removably secured to the other side of the body. The length of each of the retaining tips 16 and the guide tips 18 may be adjusted to accommodate one or more flexible members 20 received therebetween. Thus, each link 12 may include two pairs of the retaining tips 16, two pairs of the guide tips 18 or one pair of each of the retaining tips 16 and the guide tips 18. The links 12 of the cable handler 10 may include the retaining tips 16 or the guide tips 18 or both in a regular alternating pattern or randomly placed along the cable handler 10. For example, the cable handler 10 may include five links 12 having guide tips 18 adjacent one another followed by a single link 12 having retaining tips 16 followed by five additional links 12 having guide tips 18 and so on, or retaining tips 16 could be placed on every link 12 if so desired. The ratio of the number of links 12 having retaining tips 16 to the number of links 12 having guide tips 18 can be adjusted depending on the particular needs of the mining operation.

Figure 3:
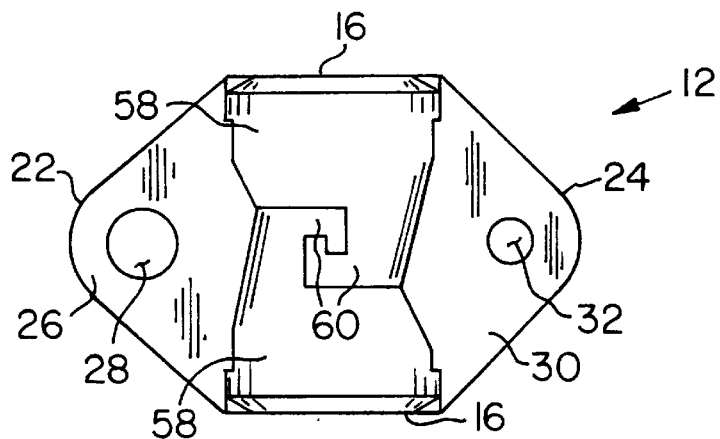
FIG. 3 is a side view of the link shown in FIG. 2.
Figure 5:
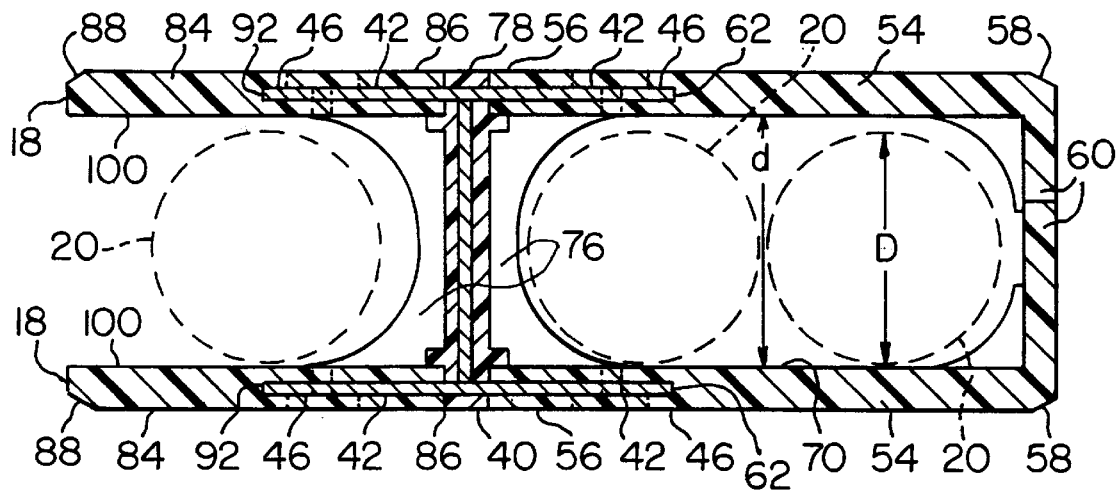
FIG. 5 is a sectional view taken along line V—V in FIG. 4.
Figure 4:
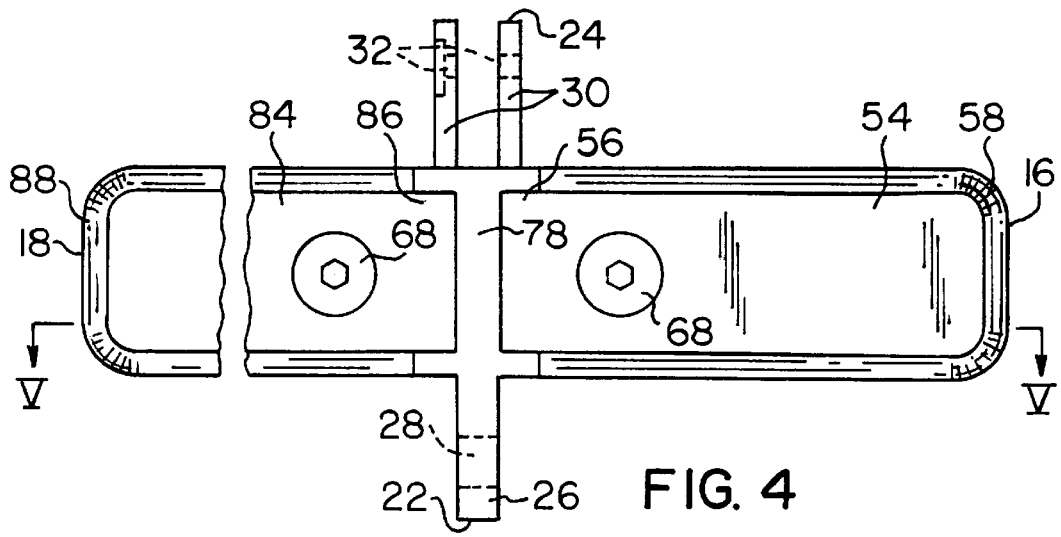
FIG. 4 is a plan view of the link shown in FIG. 2.

As shown in FIGS. 3 and 4, each body 14 has a male end 22 extending outwardly from one end of the body 14 and female end 24 extending outwardly from an opposite end of the body 14. The female end 24 is adapted to interconnect with the male end 22 of an adjacent link 12 as shown in FIG. 1. The male end 22 includes a male lug 26 having a hole 28 to receive a fastener and the female end 24 includes two spaced apart female lugs 30 to receive the male end 26 therebetween. Each female lug 30 includes a hole 32 defined to receive the fastener. A bolt can be used as a fastener to connect the male end 22 and the female end 24 of the adjacent links 12. As shown in FIGS. 2 and 5, each body 14 includes an I-beam 40 having two pairs of flanges 42 secured to a web 44. Each flange 42 includes a flange end 46.

Referring to FIGS. 1, 2, 3 and 5, the retaining tips 16 each include a retaining body 54 which is adapted to coact with the flexible member 20. The retaining tips 16 each includes a mating end 56 and an opposing interlocking portion 58 for interlocking a pair of retaining tips 16 with each other and for retaining the flexible member 20 therebetween. The interlocking portion 58 is adjacent the retaining body 54 and preferably includes a J-shaped extension 60 adapted to interlock with one another as shown in FIGS. 1-3. Alternate designs of the interlocking portions 58 could be used without departing from the scope of the invention.

Returning to FIG. 5, each retaining tip 16 includes a recess 62 adapted to receive one of the flange ends 46. Each of the flanges 42 define a hole 64 and each retaining tip 16 has a tapped hole 66 coaxially aligned with the hole 64 when the recess 62 receives the flange 42 as shown in FIG. 1. A plurality of fasteners 68, such as threaded bolts, pass through the tapped holes 66 and screw into the holes 64 to removably secure the retaining tips 16 to their respective flanges 42.

The shape of the retaining body 54 and the interlocking portion 58 may vary and depend upon the outer dimension of the flexible members 20 and the number of flexible members 20 to be retained by the links 12. FIG. 5 shows two flexible members 20 (in phantom) engaged by the retaining tips 16. When the interlocking portions 58 engage one another, the flexible members 20 are retained between the retaining tips 16. The retaining tips 16 further include an inner surface 70 against which the flexible member 20 is frictionally retained. The inner surface 70 may further include a plurality of ribs 72 to provide a frictional surface for retaining the flexible members 20.

Referring to FIGS. 1, 2 and 5, each link 12 includes a plurality of contoured ribs 76 which preferably are formed of plastic and are bonded to the I-beam 40. A suitable process for bonding plastic to steel is the Adeed process which is established in the art. The contoured ribs 76 are formed to fit the contours of the flexible members 20. This arrangement provides a proper fit by the flexible members 20 against the body 14 when the flexible members 20 are retained by the link 12. The link 12 further includes a filler section 78 which fills in the central surface area between the flange 42 not covered by the retaining tips 16 so as to provide a smooth surface on the outside of the link 12.

As depicted in FIGS. 1, 2 and 5, the link 12 may include a pair of retaining tips 16 on one side thereof and a pair of guide tips 18 on an opposite side thereof. The guide tips 18 are similar to the retaining tips in all aspects except the guide tips do not include an interlocking portion but are spaced apart from each other over their entire lengths. A flexible member 20 is retained therebetween via frictional forces from the inside surfaces of the guide tips 18.

The guide tips 18 include a guide body 84 having a mating end 86 opposite a free end 88. The mating end 86 includes a recess 92 adapted to receive a flange end 46. The guide body 84 defines a tapped hole 96 which is adapted to accept another of the fasteners 68 threadable therethrough and through hole 64 to removably secure the guide tips 18 to the flange 42. The guide tips 18 may include an inner surface 100 having a plurality of ribs 102 to provide a frictional surface for retaining the flexible member 20. The size and shape of the guide tips 18 may vary depending on the outer dimension of the flexible members 20 and the number of flexible members to be retained by the link 12.

The distance d between each pair of retaining tips 16 and/or guide tips 18 on each side of the link 12 may be adjusted to frictionally engage the flexible members 20 having a diameter D. The I-beam 40 is preferably manufactured from steel and coated with cadmium to minimize corrosion and the retaining tips 16 and guide tips 18 are preferably manufactured from plastic. The body 14, the retaining tips 16, and the cadmium coating preferably have a white reflective color to promote high visibility of the chain. The high visibility allows an operator to visually notice missing or damaged links and to see that the chain is aligned and tracking correctly behind a shearing machine.

Figure 6:
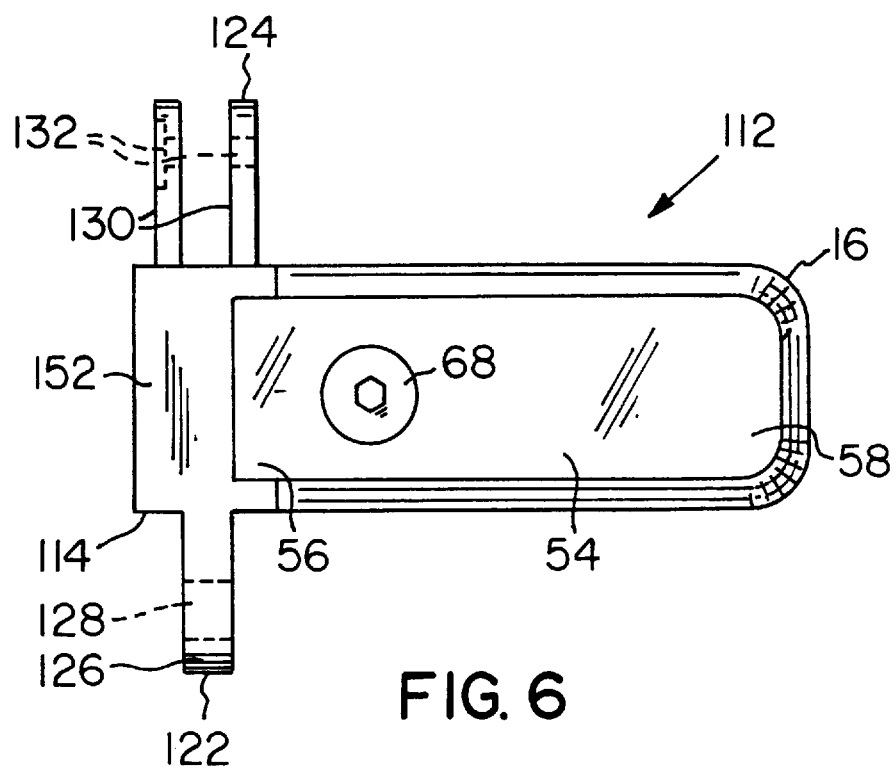
FIG. 6 is a plan view of another link made in accordance with the present invention.

The present invention further includes a modified cable handler having a plurality of individual side pull links 112 depicted in FIG. 6 and which are joined to form a modified flexible chain similar to the cable handler 10. Each of the side pull links includes a body 114 with a pair of the retaining tips 16 and/or the guide tips 18 removably secured to only one side of the body 114. The side pull link 112 differs from the link 12 in that when side pull links 112 are joined together into a flexible chain, the modified cable handler receives flexible members on only one side of the side pull links 112. Side pull links 112 having retaining tips 16 may be alternated with side pull links 112 having guide tips 18 along the length of the modified chain so that the ratio of the number of side pull links 112 with retaining tips 16 to the number of side pull links 112 with guide tips 18 is suited for any particular mining condition.

The side pull link 112 includes a body 114 having a modified I-beam (not shown) having flanges with flange ends extending from only one side thereof. The side pull link 112 further includes a male end 122, a female end 124, a male lug 126 with a hole 128, two female lugs 130 with holes 132, contoured ribs (not shown), and a filler section 152 similar to corresponding features of the link 12. The retaining tips 16 or the guide tips 18 engage with the body 114 in a similar manner to the body 14. Thus, the retaining tips 16 and the guide tips 18 may be used with either of the links 12 or side pull links 112.

Although the present invention has been described in detail in connection with the disclosed embodiments, various modifications may be made by one ordinarily skilled in the art without departing from the spirit and scope of the present invention. Therefore, the scope of the present invention should be determined by the attached claims.

I claim:

1. A cable handler for receiving and handling a flexible member, comprising:

a flexible chain having a plurality of first links adapted to retain and protect the flexible member, each of said first links including:

a main body adapted to interconnect with adjacent first links; and a pair of retaining tips secured to one side of said main body, wherein one of said retaining tips is removably secured to said main body and wherein said retaining tips are adapted to interconnect with each other and to receive and retain the flexible member therebetween.

2. A cable handler as claimed in claim 1, wherein each of said retaining tips includes a retaining body that is adapted to coact with the flexible member and an interlocking portion adjacent to said retaining body for interlocking said retaining tips and for retaining the flexible member, wherein said retaining tip that is removably secured includes a mating end for matingly engaging with said main body.

3. A cable handler as claimed in claim 2, wherein said retaining body frictionally engages the flexible member.

4. A cable handler as claimed in claim 1, further comprising a pair of guide tips secured to another side of said main body, wherein one of said guide tips is removably secured to said main body and said guide tips are spaced apart from each other and are adapted to receive the flexible member therebetween.

5. A cable handler as claimed in claim 1, further comprising a plurality of second links adapted to retain and protect the flexible member, each of said second links including:

another of said main body adapted to interconnect with adjacent first links or adjacent second links or both; and a pair of guide tips extending from a side of said other main body, wherein one of said guide tips is removably secured to said other main body and said guide tips are spaced apart from each other and are adapted to receive the flexible member therebetween.

6. A cable handler as claimed in claim 5, wherein said guide tips each include a guide body that is adapted to coact with the flexible member and an end portion adjacent to said guide body for guiding the flexible member and wherein said guide tip that is removably secured includes a mating end for matingly engaging with said other main body.

7. A cable handler as claimed in claim 6, wherein said guide body frictionally engages the flexible member.

8. A cable handler as claimed in claim 5, wherein each of said retaining tips and said guide tips are removably secured to each respective said main body and include a mating end for matingly engaging with each said respective main body.

9. A cable handler as claimed in claim 2, wherein said main body further includes an upper section and a lower section opposing each other and a side located between said upper and lower sections and a flange end adjacent to each of said upper and lower sections on said side, and wherein each of said retaining tips is removably secured to one of said flange ends and extends outwardly from said side.

10. A cable handler as claimed in claim 9, wherein said main body has an I-beam shape having a web forming said side and wherein said retaining tips define a recess in said mating end to receive said flange ends.

11. A cable handler as claimed in claim 10, wherein said body is made from steel and said retaining tips are made from plastic.

12. A cable handler as claimed in claim 11, further including plastic contour sections bonded to said web, said plastic contour sections having at least one rib adapted to retain the flexible member.

13. A cable handler as claimed in claim 12, wherein said links are colored a reflective color to promote visibility by an operator.

14. A cable handler as claimed in claim 9, wherein said main body includes a male end and a female end opposite said male end, wherein said male end is adapted to interconnect with said female end of an adjacent one of said links.

15. A link for a cable handler for receiving and handling a flexible member comprising:
 a body adapted to interconnect said link to another said link to form a chain of links; and
 a pair of retaining tips secured to said body, wherein one of said retaining tips is removably secured to said body and wherein said retaining tips are adapted to interconnect with each other and to receive and retain the flexible member therebetween.

16. A link as claimed in claim 15, further comprising a pair of guide tips secured to said body, wherein one of said guide tips is removably secured to said body and wherein said guide tips are spaced apart from each other and are adapted to receive another flexible member therebetween.

17. A link as claimed in claim 15, wherein said body further includes a first end, a second end opposite said first end, a center section and an upper section and a lower section opposing each other and having said center section located between said upper and lower sections, a male end extending from said first end, and a female end extending from said second end, wherein said male end is adapted to interconnect with said female end of another of said link, said retaining tips each being removably secured to a flange end adjacent to said upper and lower sections on a side of said center section and said retaining tips extending outwardly from said side.

18. A replacement tip for a cable handler having a main body that receives and handles a flexible member comprising:
 a retaining body;
 a mating end for mating with the main body; and
 an interlocking end adapted to interlock with another of said tip for retaining the flexible member between said tips.

19. A replacement tip as claimed in claim 18, wherein said interlocking end has a J-shape.

20. A method for repairing a cable handler made up of a plurality of links, wherein each of the links includes a body and removable tips that receive and handle a flexible member comprising:
 removing a broken tip from the body;
 securing a replacement tip to the body; and
 interlocking the replacement tip with another tip secured to the body.

* * * * *